United States Patent [19]
Olson

[11] 3,931,861
[45] Jan. 13, 1976

[54] SNOWMOBILE SUSPENSION SYSTEM
[75] Inventor: Gary A. Olson, Brillion, Wis.
[73] Assignee: Arctic Enterprises, Inc., Thief River Falls, Minn.
[22] Filed: May 28, 1974
[21] Appl. No.: 473,880

[52] U.S. Cl................................. 180/5 R; 305/24
[51] Int. Cl.².......................................... B62D 55/10
[58] Field of Search................. 305/2 A, 25, 35 EB; 180/5 R, 9.5

[56] References Cited
UNITED STATES PATENTS

| | | | |
|---|---|---|---|
| 3,527,505 | 9/1970 | Hetteen | 180/5 R |
| 3,545,821 | 12/1970 | Erickson | 180/5 R |
| 3,613,811 | 10/1971 | Brandli | 180/5 R |
| 3,690,394 | 9/1972 | Skime | 180/5 R |
| 3,719,242 | 3/1973 | Duclo | 180/5 R |
| 3,727,709 | 4/1973 | Newman | 180/5 R |
| 3,784,263 | 1/1974 | Hendrickson | 180/5 R |
| 3,788,412 | 1/1974 | Vincent | 180/5 R |

Primary Examiner—Philip Goodman
Assistant Examiner—John A. Carroll
Attorney, Agent, or Firm—Molinare, Allegretti, Newitt & Witcoff

[57] ABSTRACT

A snowmobile suspension system including a tread, a supporting frame for the tread, and front and rear suspension means suspending the frame beneath the body. The rear suspension means includes co-acting support arms and control levers permitting the relative movement between the frame and the body to exceed the movement between the support arm and frame, thus reducing the likelihood of the body striking, or "bottoming out", against the frame.

7 Claims, 5 Drawing Figures

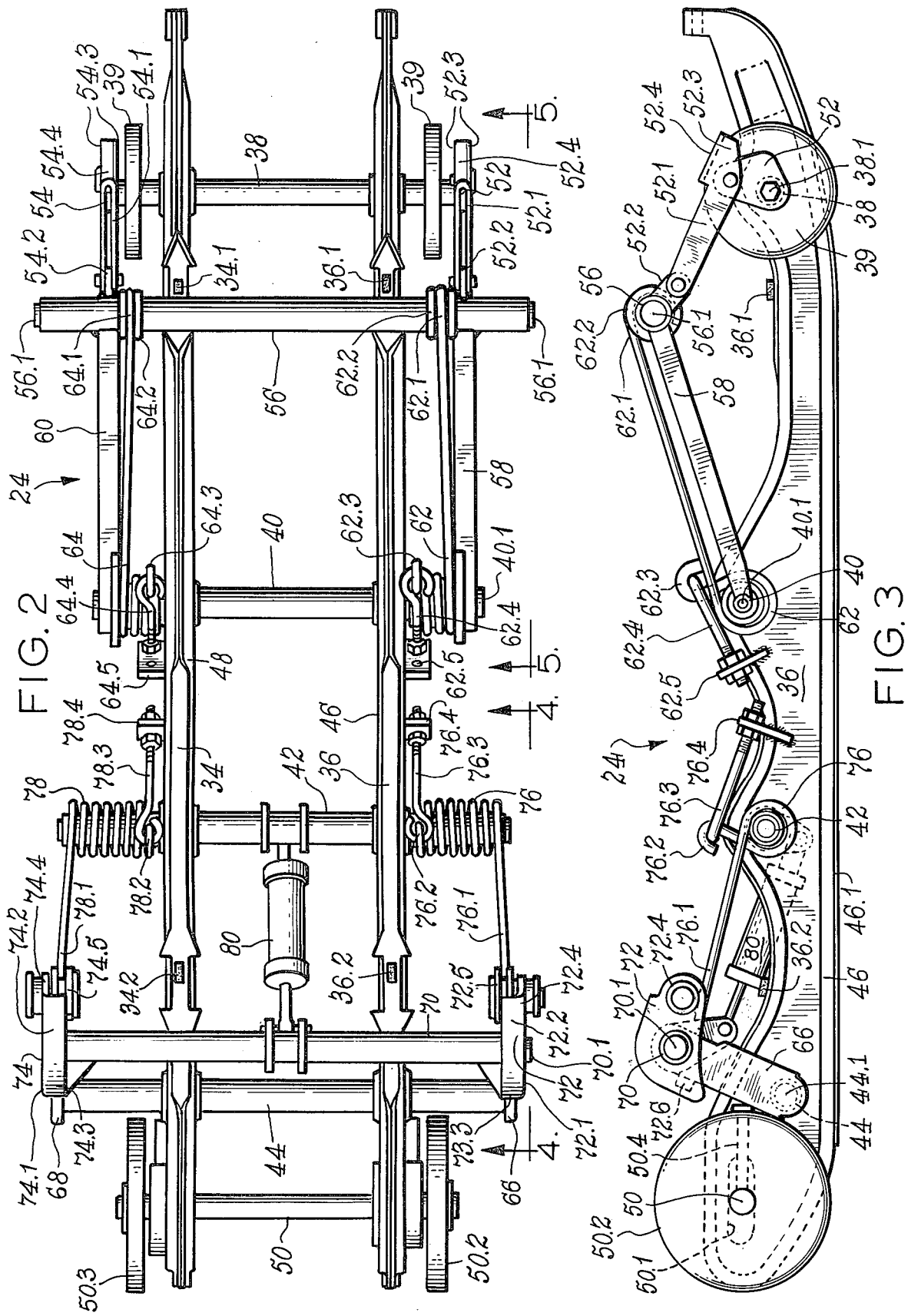

SNOWMOBILE SUSPENSION SYSTEM

BACKGROUND OF THE INVENTION

The tread of a snowmobile ordinarily is supported by a frame which in turn is connected to the snowmobile body by springs and levers in such a manner that the tread-supporting frame may move or "give" somewhat with respect to the body when the snowmobile traverses rough terrain. In general, spring-loaded connected levers are employed to join the frame of a snowmobile to the body, and the relative movement which is permitted between the frame and the body is limited by the distance the connecting levers may travel. For example, in U.S. Pat. No. 3,485,312, movement of the snowmobile frame with respect to the body is limited by the distance that upper ends of the connecting levers can travel between upper and lower longitudinal members of the frame. Similarly, in U.S. Pat. No. 3,613,811, the movement of the frame upwardly towards the body is limited by the distance which the connecting levers may travel. A reliable suspension system which would permit greater relative movement between the frame and the body is much to be desired.

BRIEF SUMMARY OF THE INVENTION

The present invention relates to a suspension system for a snowmobile having a body, a tread, and a tread-supporting frame suspended beneath the body. The suspension system includes front and rear spring-loaded suspension means. The rear suspension means comprises, on either side of the snowmobile, a support arm pivotally mounted at its lower end to the tread-supporting frame, and a control lever having spaced connections pivotally connecting it to the upper end of the support arm and to the snowmobile body, respectively. Spring means are included to oppose downward movement of the body with respect to the frame. The relative orientation of the support arms and control levers, and the spacing between the connections of the control lever to the support arm and body, permit the snowmobile body to traverse a greater vertical distance with respect to the frame than the distance traversed by the upper end of the support arm when the tread-supporting frame of the snowmobile is forced upwardly by encounter with an obstacle or the like.

BRIEF DESCRIPTION OF THE DRAWING

FIG. 2 is a plan view taken along line 2—2 of FIG. 1;

FIG. 3 is a side view of the suspension system of FIG. 2;

DETAILED DESCRIPTION OF THE PREFERRED EMBODIMENT

Figure 1:
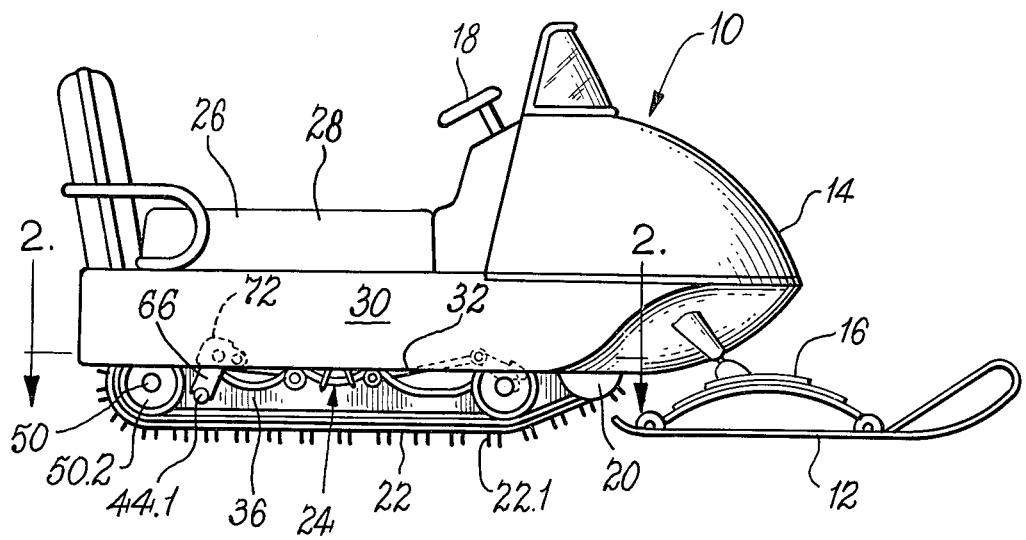
FIG. 1 is a side view of a snowmobile equipped with the suspension system of the present invention.

With reference to the drawing, wherein like characters refer to the same or similar parts throughout the several views, a snowmobile 10 is provided with a pair of front skis 12 which are secured to the snowmobile body 14 by a spring suspension system 16 and which are controlled or steered by handle bars 18. The snowmobile is powered in the usual fashion by an internal combustion engine carried within the forward portion of the snowmobile body, the engine delivering power through a chain drive mechanism or the like to a forward drive sprocket 20 having teeth meshing with an endless snowmobile tread 22 which is trained about a tread-supporting frame designated generally 24. The body of the snowmobile is reinforced by suitable structural supports where needed. The rear portion 26 of the snowmobile body is in the form of an inverted U in cross section. The rear portion of the body bears a cushion 32 on its upper surface and includes a pair of side panels 34 forming the legs of the inverted U, the side panels extending downwardly and terminating in outwardly extending foot rests 32.

The elongated tread-supporting frame 24 includes a pair of longitudinally extending, parallel frames 34, 36 which are rigidly secured to each other by fixed, hollow, tubular, transverse supports 38, 40, 42 and 44 (FIG. 2). The lower edges of the frames 34 and 36 form runners 46, 48 which in turn are provided with low-friction, synthetic resin shoes 46.1 secured to their lower surfaces.

The endless tread 22 is formed in the usual fashion from three flexible endless belt sections as shown in U.S. Pat. No. 3,485,312, the three sections being fitted together in spaced relationship to one another by transverse cleats 22.1 (FIG. 1) to provide the tread with a pair of endless, elongated slits running longitudinally of the tread. The slits are of sufficient width to allow the shoes 46.1 of the tread-supporting frame to extend into sliding contact with the cleats 22.1. In operation, the cleats slide easily on the shoes because of the low-friction plastic shoe material which is used, an example of which is a low-friction polyester resin such as "Hi-Fax 1900", a product of the Dayco Corp., Three Rivers, Michigan.

The forward drive sprockets 20 which are driven by the snowmobile engine are mounted on a shaft journaled into the body 14 of the snowmobile, the sprockets serving to drive the tread in a manner well known to the art. For example, the teeth of the sprocket may extend through the elongated endless slits in the snowmobile tread to engage the cleats 22.1. The sprockets serve to support the frontmost end of the tread.

At the rear of the tread-supporting frame, a transverse shaft 50 is slidably supported in opposed slots 50.1 in the elongated frames 34, 36, the shaft bearing at its ends free-wheeling, tread-supporting wheels 50.2, 50.3. The shaft is adjustable forwardly and rearwardly in the slots 50.1 by means of threaded, adjustable bolts 50.4 extending into the slots. Adjustment of the shaft 50 serves to vary the tension of the tread 22.

Figure 5:
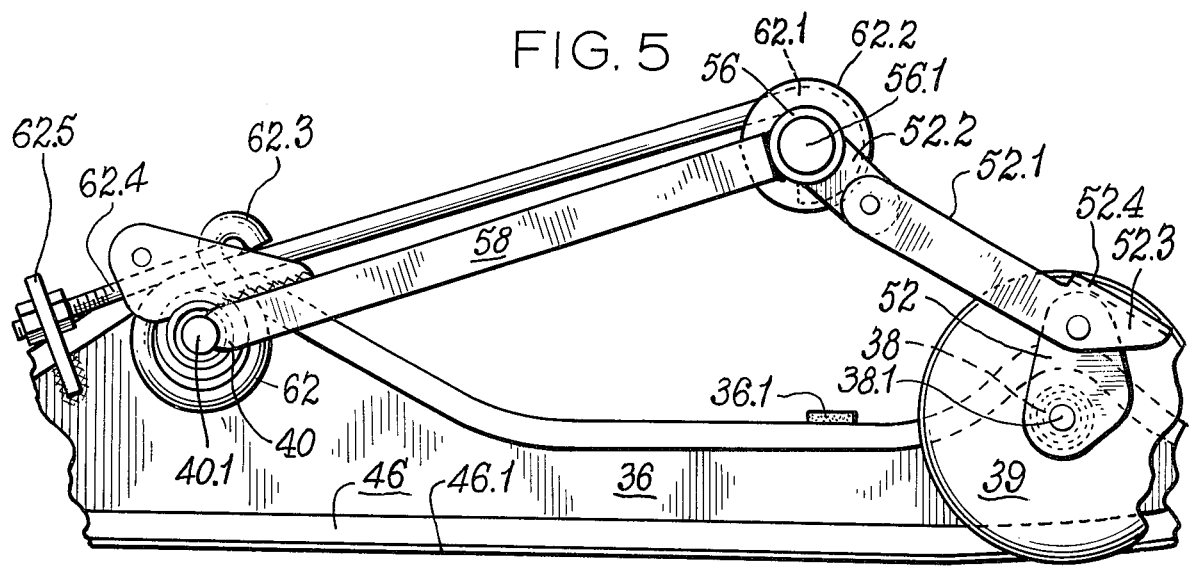
FIG. 5 is an enlarged side view of the forward portion of the suspension system of the invention, taken along line 5—5 of FIG. 2.

With reference particularly to FIGS. 2, 3 and 5, the front suspension means includes a shaft 38.1 which passes through and is rotatable within the forward tubular support 38. Tread-supporting wheels 39 may be rotatably carried at the end of the support 38. Control plates 52, 54 are rigidly mounted at their lower ends as by welding to the ends of the shaft 38.1. To the upper ends of the control plates are attached respective lower ends of a pair of control arms 52.1, 54.1, the latter in turn extending rearwardly and upwardly for pivotal attachment to projections 52.2, 54.2 rigidly mounted as by welding to the respective ends of a tubular transverse support 56. A support shaft 56.1 about which the tubular support 56 may rotate extends through the tubular support 56 and is secured at its ends to the side panels 30 of the snowmobile body.

A pair of support arms 58, 60 are rigidly attached, as by welding, to respective ends of the tubular support 56 and extend downwardly and rearwardly for rigid attachment to the ends of a support shaft 40.1 which in turn is rotatably carried within the tubular support 40. Torsion springs 62, 64 have their helical central portions mounted respectively on outward extensions of the tubular support 40, as shown best in FIG. 2. The springs have forwardly extending ends 62.1, 64.1 which pass over and around the transverse tubular support 56, the spring ends being retained in position on the ends of the transverse support by pulley-shaped spring keepers 62.2, 64.2, respectively. The other ends 62.3, 64.3 of the torsion springs 62, 64 are hook-shaped and project upwardly slightly from the helically coiled bodies of the springs. The latter ends of the springs are attached to eye bolts 62.4, 64.4 which in turn are adjustably attached to brackets 62.5, 64.5 respectively mounted to the frames 36, 38. The lower ends of the support arms 58, 60 are thus pivotable with respect to the frames 34, 36; the transverse support 56 may rotate about its axis with respect to the snowmobile body; the control arms 52.1, 54.1 are pivotable with respect to the transverse support 56 and with respect to the control plates 52 and 54; and the control plates are pivotable with respect to the frames 34, 36. The torsion springs 62, 64 oppose downward movement of the body (acting through the support shaft 56.1) with respect to the tread-supporting frame. Upon encountering an obstacle, the front end of the frame and tread are forced upwardly and rearwardly with respect to the body of the snowmobile, the torsion springs 62, 64 are compressed, the support arms 58, 60 are pivoted downwardly, and the control plates 52, 54 are pivoted forwardly with respect to the tubular support 38 to permit the front control arms 52.1, 54.1 to move downwardly and forwardly with respect to the frame. Resilient bumpers 34.1, 36.1, which may be of rubber, are mounted respectively to the upper surface of the frames 34, 36 to cushion the impact which might occur if the transverse support 56 were to be moved into contact with the upwardly jolted frames 34, 36.

When the forward end of the tread and frame have passed the encountered obstacle, the torsion springs urge the frames back into their normal positions. To prevent the frames from thus recoiling downwardly away from the body more than the desired distance, the control arms 52.1, 54.1 are provided with means for limiting this movement. Each of these control arms is provided with parallel side panels 52.3, 54.3 which are joined at their forward ends by top walls 52.4, 54.4 to form inverted U shaped channels within which the control plates 52, 54 may ride, as shown best in FIGS. 3 and 5. The top walls 52.4, 54.4 of the control arms are oriented with respect to the leading edges of the control plates 52, 54 so as to abut these leading edges when the frames 34, 36 have moved downwardly away from the body of the snowmobile a predetermined distance and to thereby prevent further movement of the frame away from the body.

The rear suspension means of the snowmobile includes a support shaft 44.1 passing through and rotatably carried by the transverse tubular support 44 near the rear of the snowmobile. A rear transverse tubular support 70, which is parallel to but normally above and forward of the tubular support 44, is supported by rear support arms 66, 68, which respectively join the ends of the support shaft 44.1 to the corresponding ends of the tubular support 70. A rotatable shaft 70.1 passes through the tubular support 70. To the ends of the rotatable shaft 70.1 are rigidly attached rear control levers 72, 74, respectively. Each of the rear control levers include substantially vertical side panels 72.1, 74.1 having inwardly directed flanges at the top and rear edges thereof, respectively, the top flanges being identified as 72.2, 74.2, and the rear flanges being identified as 72.3, 74.3. Bushings 72.4, 74.4 are provided in the respective side panels 72.1, 74.1 of the rear control levers, the bushings being spaced forwardly of the connection of the control levers with the rear support arms. The bushings 72.4, 74.4 connect the rear suspension means to the body of the snowmobile by means of bolts or the like, and further serve as supporting spindles about which are carried pulley-shaped spring keepers 72.5, 74.5, of which more will be said below. The rear control levers 72 and 74 preferably are shaped so that the top and rear inwardly directed flanges form an obtuse angle between them and so that the axis of rotation of the supporting shaft 70.1 is on an imaginary line approximately bisecting the angle formed by the top and rear flanges. The rear flanges overlie the rear edges of the rear support arms 66, 68, and resilient stops or bumpers 72.6 are secured to the rear edges of the support arms to cushion any impact between the rear flanges and the support arms. Also, as in the case of the transverse support 56 in the forward support means, the transverse tubular support 70 could strike the upper surface of the frames 34, 36 as the frame is jolted upwardly in response to an encounter of the tread with an obstruction; a pair of resilient bumpers 34.2, 36.2 are secured to the upper surface of the frame in position to cushion the shock from the tubular support 70 should this occur.

A pair of rear torsion springs 76, 78 have their respective helical central portions mounted about outward extensions of the tubular support 42. The rearwardly extending ends 76.1, 78.1 of the rear torsion springs respectively pass beneath and are laterally retained by the spring keepers 72.5, 74.5 mounted on the bushings 72.4, 74.4, respectively. The spring keepers preferably are of low-friction polyester material to permit longitudinal movement of the spring ends thereagainst. The other ends 76.2, 78.2 of the springs 76, 78 extend upwardly slightly from the helical body of the springs and are hook-shaped to receive eye bolts 76.3, 78.3 which in turn are adjustably secured to brackets 76.4, 78.4 mounted to the respective frames 36, 34.

Mounted between the transverse tubular supports 70 and 42 is a shock absorber 80 to dampen movements of the frame with respect to the body in a manner similar to that described in U.S. Pat. No. 3,690,394.

Figure 4:
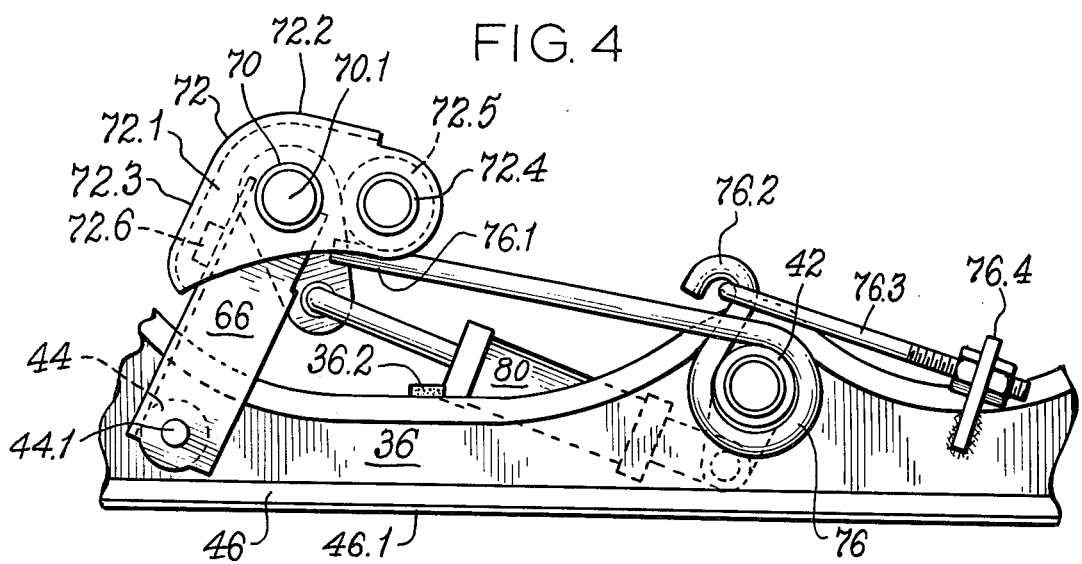
FIG. 4 is an enlarged side view of the rearward portion of the suspension system of the invention, taken along line 4—4 of FIG. 2.

It will thus be understood that the rear support arms 66, 68 pivotally define a first pivot position with respect to the frames 34 and 36; the support shaft 70.1 and the rear control levers 72 and 74 pivotally define a second pivot position with respect to the tubular rear transverse support 70 and hence to the rear support arms 66 and 68; and the forward ends of the rear control levers 72 and 74 are pivotally mounted through the bushings 72.4, 74.4, to the body of the snowmobile to define a third pivot position. As in the case of the forward suspension means, the rear torsion springs 76, 78 oppose downward movement of the snowmobile body with respect to the frame. As the rear end of the tread and frame encounters an obstacle and is forced upwardly, the rear torsion springs 76, 78 are compressed and the rear tubular support 70 moves downwardly toward the rubber bumpers 43.2, 36.2 mounted on the frames 34 and 36. If the encounter with the obstacle is sufficiently severe, the tubular support 70 will "bottom", that is, it will strike the bumpers 34.2, 36.2. In prior art suspension systems such as those discussed previously, the distance that the body of the snowmobile could travel with respect to the frame before "bottoming" would be essentially the distance which a transverse body supporting member could travel from its initial position to its "bottoming" position against the frame. In the instant invention, however, the arrangement of the rear control levers 72 and 74 permit the snowmobile body to travel a greater distance with respect to the frame than that distance traversed only by the transverse tubular support 70, for example. This is possible because the forward ends of the control levers 72, 74 are pivotally attached to the snowmobile body 26; as the frame travels towards the snowmobile body upon encountering an obstacle, the rear control levers pivot in a clockwise direction (as viewed in FIGS. 3 and 4) about the shaft 70.1, and the tubular transverse support 70 will not "bottom" against the rubber bumpers until the connection of the bushings 72.4 to the snowmobile body are well below the upper edge of the frame. That is, as the rearward ends of the frame and tread are jarred upwardly by contact with an obstacle, both the rear support arms and the rear control levers may pivot in clockwise direction (about shafts 44.1 and 70.1, respectively), and at such time as the rear tubular support 70 comes into contact with the rubber bumpers 34.2, 36.2, the connection of the body through the bushings 72.4, 74.4 to the rear control levers is well below the upper edges of the frames 34, 36. It may be noted that the axes of the shaft 70.1 and the bushing 72.4 are normally spaced substantially horizontally as shown in FIG. 4, but when the frame is flexed fully upwardly towards the body (as when an obstacle is encountered), then the axis of the bushing 72.4 will be substantially vertically disposed beneath the axis of the shaft 70.1; hence, the distance which the rear end of the body can travel with respect to the frame is approximately equal to the length of travel permitted the rear tubular support 70 plus the distance separating the shaft 70 from the bushing 72.4, 74.4. Because of the increased travel thus permitted the body, "bottoming" will occur less frequently, and a smoother ride is provided.

After the obstacle encountered by the rear portion of the frame has been passed, the rear torsion springs 76 and 78 force the frames 36, 34 back towards their original position as shown in FIG. 4. To prevent the frames from moving downwardly beyond a predetermined distance from the the body, the rear flanges 73.3, 74.3 of the rear control levers 72, 74 come into contact with the rubber stops, or bumpers, 72.6, 74.6, thus limiting the counter clockwise rotation (as viewed in FIGS. 3 and 4) of the rear control levers. These flanges also serve as guides for the snowmobile tread 22, and prevent the tread from riding on the transverse tubular support 70.

While I have described a preferred embodiment of the present invention, it should be understood that various changes, adaptations, and modifications may be made therein without departing from the spirit of the invention and the scope of the appended claims.

I claim:

1. In a snowmobile having a body, a tread, a tread supporting frame suspended beneath the body, and a suspension system for interconnecting said frame to said body for providing significant freedom of relative movement therebetween, said suspension system including laterally spaced first and second suspension means, an improved first suspension means comprising in combination, a rigid arm having first and second ends, said first end being pivotally interconnected to said frame at a first pivot position, a rigid lever having one end and another end, said one end being pivotally interconnected to said body at a second pivot position, said second pivot position being spaced above and laterally of said first pivot position, said second end of said arm being pivotally interconnected to said another end of said lever at a third pivot position moveable relative to both said first and second pivot positions, said first and second pivot positions being moveable between a first vertically spaced apart position and a second vertically spaced apart position less than said first vertically spaced position, said third pivot position being spaced substantially horizontally from said second pivot position at said first vertically spaced position, and being substantially vertically spaced below said second pivot position at said second vertically spaced position, and means for normally biasing said arm and said lever into said first vertically spaced position, whereby the snowmobile body traverses a greater distance with respect to said frame than the distance traversed by said second end of said arm when said frame is forced upwardly toward said body.

2. The improvement of claim 1 including means for limiting movement of said first and second pivot positions between said vertically spaced position and said second vertically spaced position.

3. The improvement of claim 1 wherein said lever includes a side panel and a flange extending inwardly from top and rear edges thereof, said flange being oriented for engaging and guiding said tread of said snowmobile.

4. The improvement of claim 3 wherein the rear inwardly directed flange of said lever confronts a rearward edge of said arm, and wherein each arm includes, on its rear surface, a resilient bumper contactable by said rear flange of said lever when said frame and said body are at a predetermined distance apart.

5. The improvement of claim 4 wherein said third pivot position has an axis of rotation on an imaginery line approximately bisecting the angle formed by said top and rear flanges.

6. The improvement of claim 1 including two sides for said frame, and first and second sets of said arms and said levers operatively interconnected to said frame sides and said body.

7. The apparatus of claim 1 wherein said biasing means comprises torsion spring means having a helical portion mounted on said frame and including portions contacting said levers at a spaced position from said helical portion for normally biasing said lever and thereby said first and second pivot points to said first and second vertically spaced positions.

* * * * *